(12) United States Patent
Maeda et al.

(10) Patent No.: US 6,403,921 B1
(45) Date of Patent: Jun. 11, 2002

(54) METHOD AND APPARATUS FOR WELDING A PLURALITY OF WINDINGS OF ROTARY ELECTRIC MACHINE

(75) Inventors: Kazutaka Maeda, Toyota; Mitsuru Kato; Mitsuaki Taira, both of Anjo; Kimihiro Kuno, Tokai; Mamoru Urushizaki, Chiryu, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/482,959

(22) Filed: Jan. 14, 2000

(30) Foreign Application Priority Data

Mar. 30, 1999 (JP) .............................. 11-089790
Aug. 6, 1999 (JP) .............................. 11-224502

(51) Int. Cl.$^7$ ................................................ B23K 9/00
(52) U.S. Cl. ........................ 219/125.11; 29/598; 219/75
(58) Field of Search ................ 219/125.11, 137 R, 219/75, 137 PS; 29/598

(56) References Cited

U.S. PATENT DOCUMENTS

| 1,258,735 | A | * | 3/1918 | Apple ..................... 219/137 R |
| 4,225,770 | A | * | 9/1980 | Moore et al. .......... 219/125.11 |
| 4,436,982 | A | * | 3/1984 | Kokura et al. ......... 219/137 PS |
| 5,745,977 | A | * | 5/1998 | Ichikawa et al. ............. 29/598 |

FOREIGN PATENT DOCUMENTS

| WO | 92/06527 | 4/1992 |
| WO | 98/54823 | 12/1998 |

* cited by examiner

Primary Examiner—Clifford C. Shaw
(74) Attorney, Agent, or Firm—Oliff & Berridge, PLC

(57) ABSTRACT

A method of welding a plurality of connection ends of a plurality of copper segments forming a circumferentially disposed stator winding of a rotary electric machine. The method includes a step of inserting a protection member between connection ends of adjacent two of the plurality of copper segments, a step of activating a welder tool, and a step of circumferentially moving the welder tool relative to the connection ends.

21 Claims, 5 Drawing Sheets

METHOD AND APPARATUS FOR WELDING A PLURALITY OF WINDINGS OF ROTARY ELECTRIC MACHINE

CROSS REFERENCE TO RELATED APPLICATION

The present application is based on and claims priority from Japanese Patent Applications Hei 11-89790 filed Mar. 30, 1999, and Hei 11-224502 filed Aug. 6, 1999, the contents of which are incorporated herein by reference.

BACKGROUND OF THE INVENTION

1. Field of the Invention

The present invention relates to a method and an apparatus for welding a plurality of windings of a rotary electric machine, which is preferable to be applied to a method and an apparatus for welding stator winding of a vehicle AC generator.

2. Description of the Related Art

It is well known that stator winding are welded together in the heat of arc discharges between an electrode and connection ends of the stator winding.

Because a magnet wire of the stator winding is usually covered with an insulation coating, it is necessary to protect the insulation coating from such welding heat. For this purpose, arc-voltage is intermittently applied to a limited portion each time so that the welding heat may not affect portions other than connection ends.

However, such an intermittent welding or a step of applying intermittent voltage to each limited portion may be affected by unstable welding current at the starting time of the arc welding, resulting in unstable levels of welding quality. Since such unstable welding current may cause an excessive heat condition, it is difficult to protect the insulation coating. Such an intermittent welding also necessitates many man-hours.

SUMMARY OF THE INVENTION

The present invention has been made to solve the above described problems, and, therefore, a main object of the invention is to protect insulation coatings of a stator winding.

Another object of the present invention is to provide a high-speed-and-stable welding method and welding apparatus.

According to a main aspect of the invention, a method comprising a step of inserting a protection member into each space between adjacent two of a plurality of connection ends, a step of activating a welder tool, and a step of moving the welder tool relative to the connection ends in the circumferential direction.

Because of the protection member inserted in the space between adjacent two of the connection ends, heat deterioration of the insulation coating between two of the connection ends can be prevented. The heat applied to one of the connection ends is conducted to another so that the connection ends just welded can be gradually cooled. Accordingly, blow holes or cracks formed at the connection ends can be suppressed. Because the connection ends just before being welded can be preheated, efficient welding can be achieved.

According to another aspect of the invention, the step of activating the welder tool and the step of moving the welder tool are alternately carried out.

Accordingly, the welder tool is activated to weld the connection ends. The connection ends and the welder tool are relatively moved in the circumferential direction so that the connection ends can be welded one by one. Because the portion between adjacent two of the connection ends is protected by the protecting member, the insulation coating of portions other than the connection ends can be prevented from deteriorating. The adjacent connection ends to have been welded before or to be welded next can be gradually cooled or heated.

According to another aspect of the invention, the step of activating and the step of moving are concurrently carried out. The activation of the welder tool and the moving of the same are carried out concurrently. In other words, the relative position between the connection ends and the welder tool is moved while the welder tool is activated. The welder tool is activated while it is moved between adjacent two of the connection ends. Because the protection member is disposed between adjacent two of the connection ends, deterioration of the insulation coating of portions other than the connection ends can be suppressed. In an arc-welding, because an arc voltage is continuously applied across the connection ends and a welder tool to activate the welder tool, the problem caused by unstable welding current at the starting time of the arc welding can be solved. Since the welder tool can be moved while the arc voltage is applied, the connection ends can be welded at a high speed.

According to another aspect of the invention, the protection member has an axial contact length L in contact with the copper segments, and the length L is equal to or larger than circumferential thickness T of the copper segment. Accordingly, the deterioration length of the insulation coating that corresponds to the length L can be reduced.

According to another aspect of the invention, a difference A between two copper segments is as thin as or thinner than ⅓ of a width W of said copper segment in circumferential direction.

Accordingly, the height H of the connection ends can be reduced so that the deterioration width W of the insulation coating can be reduced.

According to another main aspect of the invention, an apparatus of welding a plurality of connection ends of copper segments of a circumferentially disposed stator winding of a rotary electric machine comprises a welder tool movable relative to connection ends, a welder power source for activating the welder tool, moving means for moving the welder tool relative to connection ends, and protecting members inserted into each space between adjacent two of said plurality of connection ends.

The moving means can either move the welder tool or move the connection ends.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

The invention is described below with reference to the appended drawings.

Figure 1:
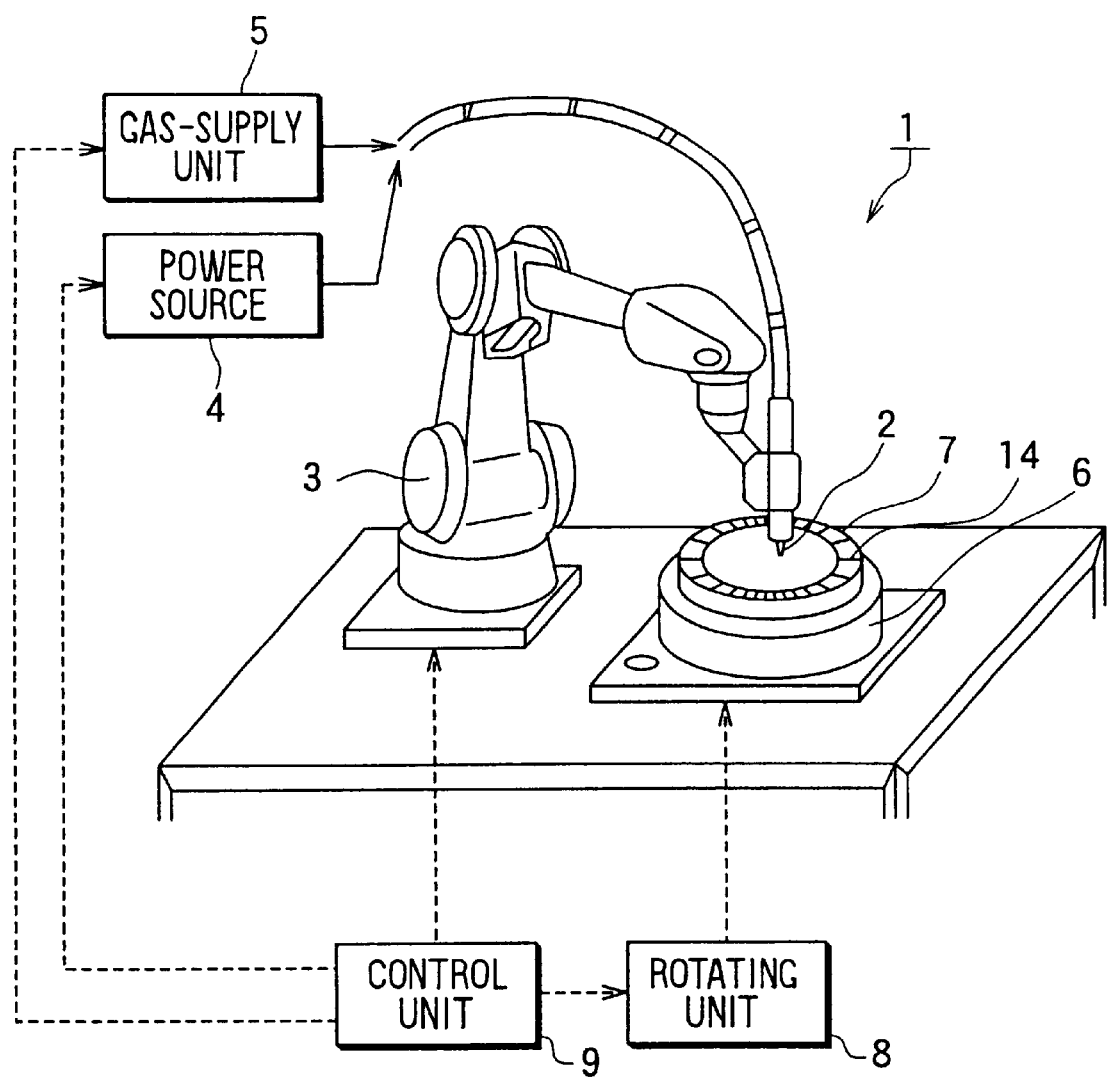
FIG. 1 is a schematic diagram illustrating an apparatus for welding a stator winding according to a preferred embodiment of the invention.

In FIG. 1, welding apparatus 1 includes torch 2 as a welder tool which has an electrode, robot arm 3, welding-power source 4 for supplying the electrode with electric power, gas-supply unit 5 for supplying torch 2 with inert gas, fixing table 6 on which stator 14 with the copper segments is fixed, copper-segment-chucking tool 7, fixing-table-rotating unit 8, control unit 9 for controlling robot arm 3, rotating unit 8, welding-power source 4, and gas-supply unit 5.

The electrode of torch 9 is made of tungsten and is fixed to the edge of robot arm 3. Torch 2 is connected to a negative terminal of welding-power source 4, forming a negative electrode of welding apparatus 1. Torch 2 is supplied from gas-supply unit 5 with inert gas such as argon gas or helium gas. A welder having a tungsten electrode at one side that is operated while inert gas such as argon gas or helium gas is supplied is well known as a TIG welder (Tungsten Inert Gas Arc Welding).

Robot arm 3 is controlled by control signals from control unit 9 so that the head of torch 2 can trace the profile of target 13 which is a pair of connection ends of the copper segments to be welded.

The copper segment to be welded is disclosed in WO98/54823 (laid open in 1998). The copper segment has a U-shaped turn portion and a rectangular cross-section. Stator core 15 shown in FIGS. 4 and 5 has a plurality of slots formed at equal intervals. The copper segments are inserted into the slots in the radial direction so that the turn portions thereof are aligned at one end of stator core 15. Thereafter, all the ends of the copper segments opposite the turn portions disposed in the same radial position are twisted to incline in the same direction to extends a prescribed pitch. On the other hand, all the ends of the copper segments disposed in the position radially adjacent thereto are twisted to incline in the opposite direction to extends a prescribed pitch.

Figure 2:
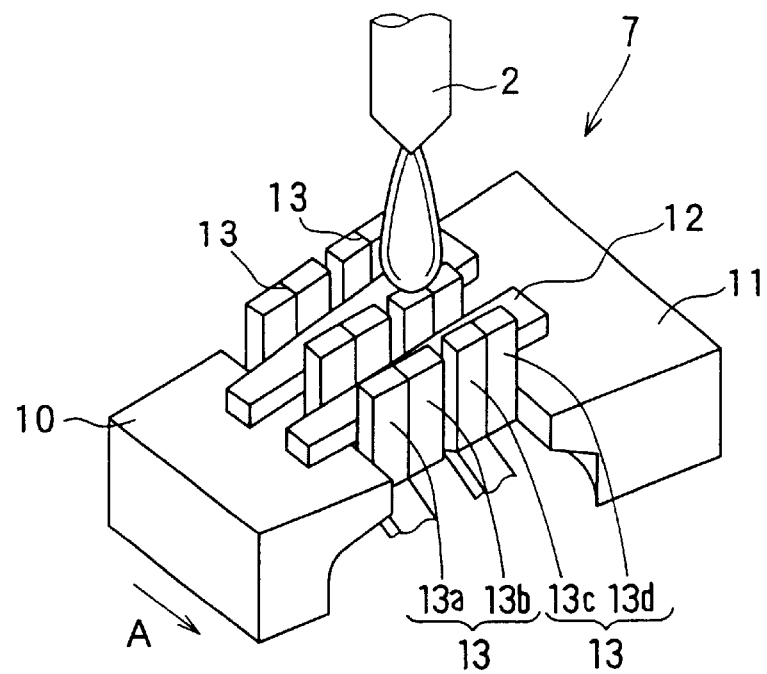
FIG. 2 is an enlarged schematic diagram of connection ends of copper segments of a stator winding.

As shown in FIG. 2, four connection ends 13a, 13b, 13c, 13d of the copper segments radially disposed at the end of the stator to be welded are grouped into two pairs 13,13 in the radial direction. The two pairs as targets are spaced apart to insulate from each other. A plurality of pairs 13 to be welded together are respectively disposed in two coaxial circular layers r1, r2 at equal intervals. The insulation coating of the connection ends to be welded is removed by a cutter or a chemical agent before or after the copper segments are inserted into the slots. Thus, stator 14 is placed on the fixing table 6 with the pairs 13 of the copper segments being upside.

As shown in FIG. 2, chucking tool 7 includes inside positive electrode 10 in contact with the copper segments from the inside of stator 14, positive electrode 11 in contact with the copper segments from the outside of the stator, and a plurality of protecting members or rod-like electrodes 12. Inside positive electrode 10 is in contact with the copper segments to fix the same in the radial direction. In addition, each rod-like positive electrode 12 is inserted between two of the circumferentially adjacent pairs 13 in contact therewith to fix the same in the circumferential direction.

Each rod-like positive electrode 12 is formed so that the width thereof increases as it leaves from the center of stator 14 to keep contact with the copper segments.

As shown in FIG. 1, fixing table 6 is rotated by rotating unit 8 according to signals from control unit 9. As a result, stator 14 fixed to the fixing table 6 and chucking tool 7 disposed at the connection ends are rotated together.

Operation of the above described welding apparatus 1 and a method of welding the windings and manufacturing the stator will be described below.

Figure 6A:
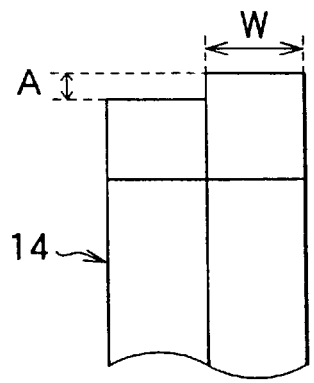
FIG. 6A is a schematic diagram illustrating the connection ends.

Firstly, U-shaped copper segments are inserted into respective slots of stator core 15. If difference A in height between copper segments when they are inserted into some of the slots as illustrated in FIG. 6A increases, the volume to be welded becomes larger. Accordingly, necessary welding power becomes large to deteriorate the insulation coating.

Figure 6B:
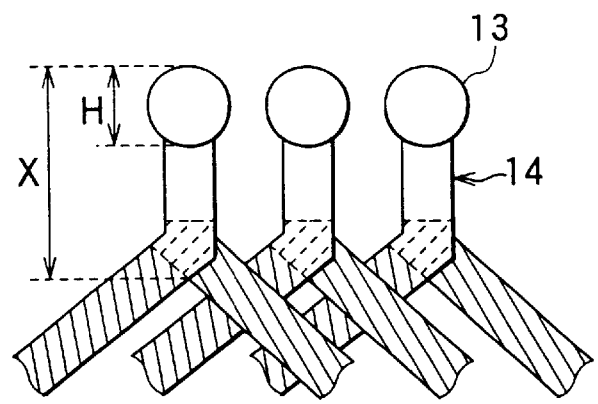
FIG. 6B is a schematic diagram showing measurements of various portions thereof.

In FIG. 6B, heat-deteriorated portions of the insulation coatings are indicated by dotted-line-hatching, and undeteriorated portions are indicated by solid-line-hatching. As illustrated in FIG. 6B, pairs 13 after being welded has a height H (hereinafter referred to as weld-height), and a deteriorated insulation coating has length X (i.e. a length between the edge of pairs 13 and the lower end of a deteriorated portion).

Figure 7:
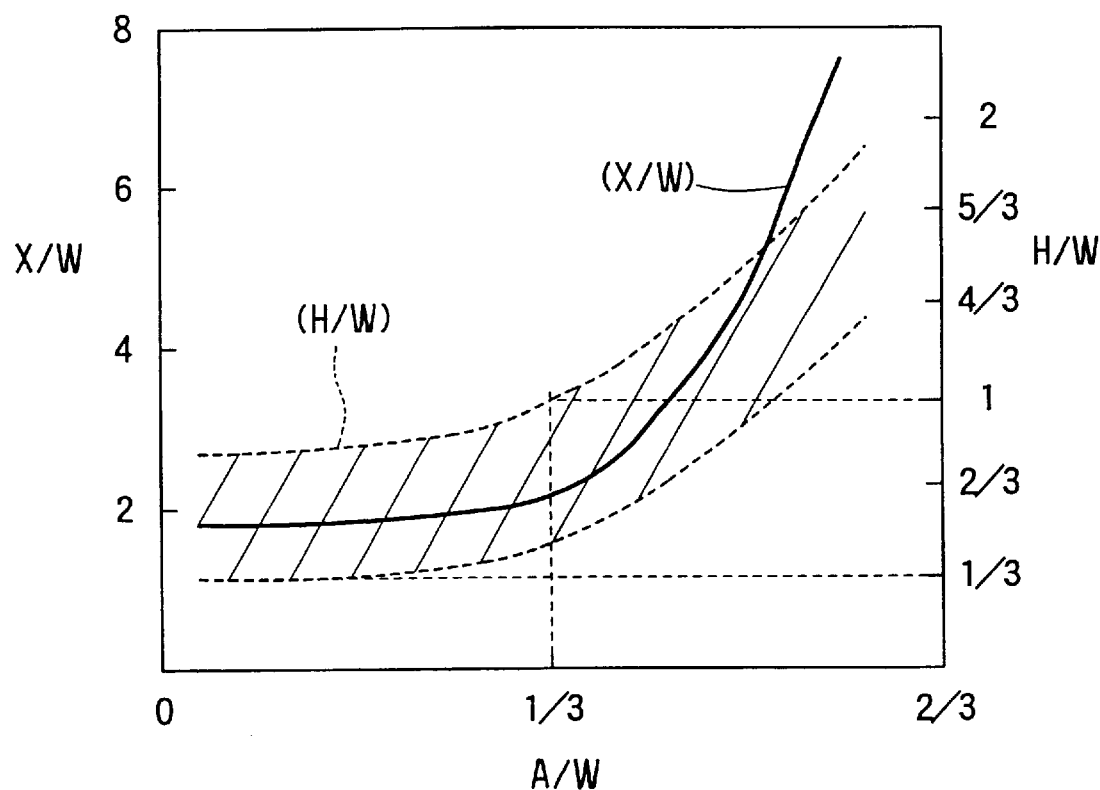
FIG. 7 is a graph showing relationship between difference A in height in the adjacent connection ends and weld-height H, and relationship between the difference A and lengths X of deteriorated coatings.

FIG. 7 shows relationship between differences A and weld-height H and relationship between differences A and lengths X. Here, ratios of the differences A to radial width W of the copper segment, and ratios of the heights H thereto and the lengths X thereto are shown.

In FIG. 7, the hatched portion indicates a range of the welded copper segments that are in the normal condition. That is, the weld-height becomes higher as the difference A increases. The length of the deteriorated portion x sharply increases as the difference A increases. In other words, if the ratio A/W becomes larger than ⅓, the length X sharply increases. It is, therefore, necessary to control the ratio A/W to be not larger than ⅓.

When the copper segments are inserted into the slots, the ratio A/W is checked to be controlled to be equal to or less than ⅓. This step is carried out at whole circumferential portions of stator core 15, so that only those found to be normal can be sent to the next step.

Thereafter, the edge portions of the connection ends 13a, 13b, 13c, 13d to be welded are twisted. Stator 14 before welding is mounted on fixing table 6 with pairs 13 being upside.

After fixing stator 14 of fixing table 6, inside positive electrode 10 is placed from inside, and outside positive electrode 11 is placed from outside. Rod-like positive electrode 12 is inserted between circumferentially adjacent copper segments to bridge inside positive electrode 10 and outside positive electrode 11. Thus, four radially aligned connection ends 13a, 13b, 13c, 13d are fixed in both radial and circumferential directions. Both sides of connection ends 13a, 13b, 13c, 13d of the copper segments are in contact with rod-like positive electrode 12, and inclined portions 16 of the copper segments are covered by rod-like positive electrode 12, so that inclined portions 16 become invisible viewed from the side of torch 2.

Figure 8:
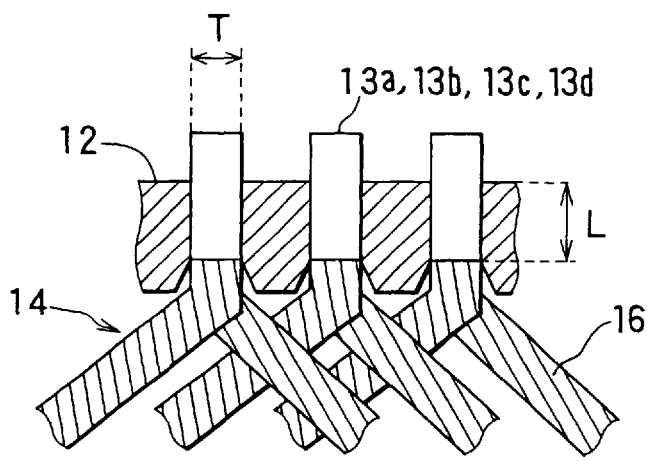
FIG. 8 is a schematic diagram showing a rod-like positive electrode located between copper segments.
Figure 9:
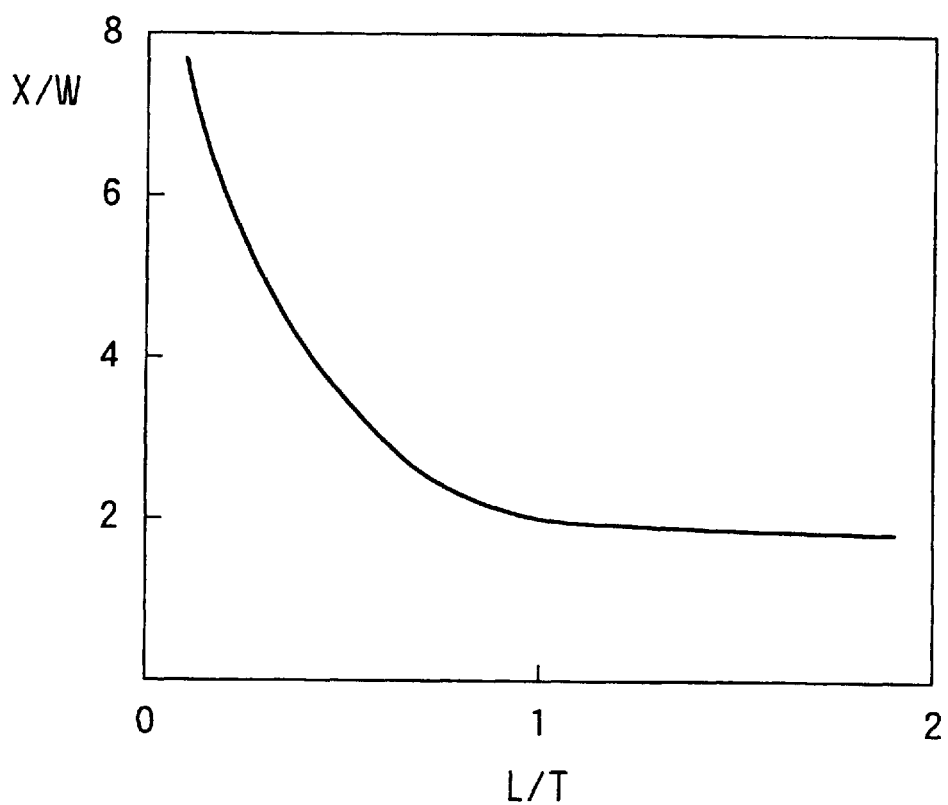
FIG. 9 is a graph showing relationship between contact lengths L of the rod-like positive electrode with copper segments and lengths X of the deteriorated coatings.

FIG. 8 shows the contact length L of rod-like positive electrode with the copper segments, the thickness T of the copper segments of stator 14 in the circumferential direction thereof. Optimum ratios L/T and ratio X/W are found in an experiment. As shown in FIG. 9, the ratio X/W increases as the ratio L/T decreases. In particular, if the ratio L/T becomes smaller than 1, the ratio X/W sharply increases. Therefore, the length X of the deteriorated portion is limited so that the L/T can become larger than 1.

As shown in FIG. 8, the rod-like positive electrode 12 is brought into contact with the whole portion of pairs 13 from which the insulation coating is removed so that the contact area of rod-like positive electrode 12 with pairs 13 can be maximum. The cross-sectional area of the contact portions of rod-like positive electrode 12 is shaped like a base-ball-home-base so that rod-like positive electrode 12 may not be in contact with the copper segments below the contact portion. Thus, the contact area of rod-like positive electrode 12 in contact with the copper segments is increased so that heat radiation areas can be increased.

Thereafter, torch 2 fixed to the edge of robot arm 3 is moved to a portion above pairs 13 in the radially outer layer which is the starting portion of welding according to signals from control unit 9. After torch 2 is moved to the starting portion, welding voltage is applied across torch 2 and chucking tool 7, and inert gas is supplied by gas-supply unit 5 to torch 2.

After the welding voltage is applied, fixing table 6 is rotated clockwise (as indicated by an arrow A in FIG. 2) while the distance between torch 2 and pairs 13 is maintained. At this stage, the welding voltage is continuously applied, and torch 2 is positioned at a fixed position. As a result, arc-welding is continuously carried out from one of pairs 13 just under torch 2 to another of pairs 13 adjacent thereto sequentially in the circumferential direction.

Figure 3:
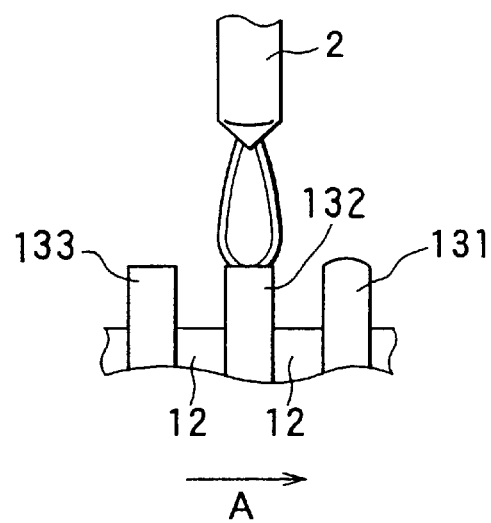
FIG. 3 is a schematic diagram of the connection ends and a torch viewed from a position inside stator.

In FIG. 3, pair 131 of the connection ends located right is one of the pairs already welded, Pair 133 of the connection ends located left is one of the pairs which waits for the arc-welding. Pair 132 that is just arc-welded is heated by the arc at a high temperature. The heat given to pair 132 is radiated to surrounding air through chucking tool 7 including positive electrode 12 and the like. The heat of arc-welding and heat of pair 132 are transmitted to pairs 131, 133 adjacent thereto. Therefore, the pair 131 after being welded is not immediately cooled but gradually cooled. Pair 133 waiting for arc-welding is heated before welding.

While fixing table 6 is rotated, pairs 13 are continuously arc-welded in the circumferential direction until fixing table 6 has been rotated one turn. Fixing table 6 is, thereafter stopped, and supply of welding voltage and inert gas is also stopped.

Subsequently, robot arm 3 is moved radially inside and fixed at a position above one of pairs 13. Pairs 13 of a radially inner layer are also continuously welded in the same manner.

Pairs 13 of the inner layer are also continuously welded in the same manner as above while torch 2 is fixed and fixing table 6 is rotated. After fixing table 6 is rotated one turn, fixing table 6 is stopped, and supply of welding voltage and inert gas is also stopped.

Figure 4:
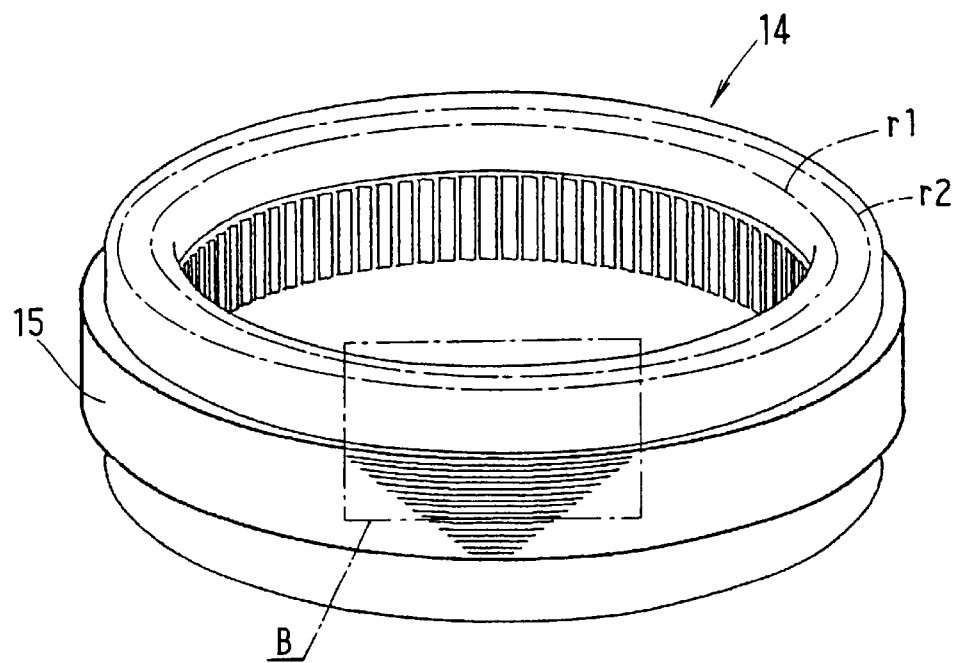
FIG. 4 is a schematic perspective diagram of the stator according to the preferred embodiment.
Figure 5:
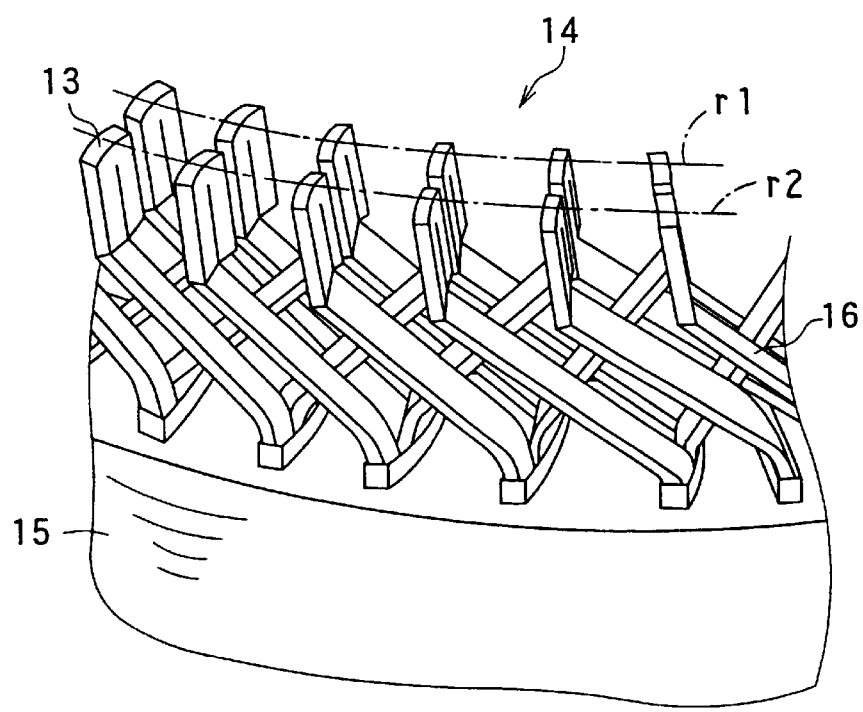
FIG. 5 is an enlarged perspective view of portion B in FIG. 4.

After connection ends of the radially outer and inner layers are welded, torch 2 is separated from stator 14. Then, chucking tool 7 is removed from the copper segments, and stator 14 having the welded stator winding is removed from fixing table 6. Thus, stator 14 as shown in FIGS. 4 and 5 is provided. Thereafter, pairs 13 are inspected and flaws, if any, are coated with insulation resin.

In stator 14 according to the preferred embodiment of the invention, as shown in FIG. 5, a gap is formed between adjacent pairs of the connection ends to prevent short-circuiting. However, no gap is formed between connection ends 13a, 13b of the first layer and second layer and between connection ends 13c, 13d of the third layer and fourth layer thereof. Therefore, it is necessary to insulate the inclined portions 16 from each other.

Rod-like positive electrode 12 is inserted between circumferentially adjacent pairs 13 for arc-welding. Therefore, only pairs 13 of the copper segments are exposed to torch 2 from rod-like positive electrode 12, and inclined portions 14 are not exposed to torch 2. Therefore, even if fixing table 6 is rotated, the insulation coating of inclined portions 14 is protected by rod-like positive electrode 12 from arc heat.

Because arc voltage is continuously applied, a stable welding without starting unstable welding current can be ensured. The continuous welding also reduces welding time of the stator.

When the copper segments are welded, torch 2 is fixed and the connection ends are rotated. However, torch 2 can be moved along pairs 13 of the stator 3 while the connection ends of the stator are fixed.

Pairs 13 of the connection ends are continuously welded while the welding voltage is applied. However, the connection ends can be welded one by one while the welding voltage is applied each time torch is moved to one after another. In this case, rod-like positive electrode 12 can protect the insulation coating of the inclined portions 14.

The description has been made with respect to the TIG welding. However, other arc-welding such as CO2 welding of MIG welding can provide the same effects. A laser welding instead of the arc-welding can provide the same effect.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. A method of welding a plurality of pairs of connection ends of a plurality of segments of a circumferentially disposed stator winding of a rotary electric machine, said method comprising:
   a step of inserting a protection member having substantially flat circumferential side surfaces between said pairs so that said side surfaces can be in contact with said pairs;
   a step of activating a welder tool; and
   a step of circumferentially moving said welder tool relative to said pairs.

2. The method as claimed in claim 1, wherein said step of activating and said step of moving are alternately carried out.

3. The method as claimed in claim 1, wherein said activation step and said moving step are concurrently carried out.

4. The method as claimed in claim 1, wherein said protection member has an axial contact length L in contact with said segments at said circumferential side surfaces, and said length L is equal to or larger than a circumferential thickness T of said segment.

5. The method as claimed in claim 1, wherein an axial difference A between two connection ends to be welded is as wide as or thinner than $\frac{1}{3}$ of a radial width W of said segment.

6. A method as claimed in claim 1, wherein said pairs extend from a top portion of the protection member and toward said welding tool during the step of activating.

7. An apparatus of welding a plurality of pairs of connection ends of segments of a circumferentially disposed stator winding of a rotary electric machine, said apparatus comprising:

a welder tool movable relative to said pairs;

a power source for activating said welder tool;

moving means for moving said welder tool relative to pairs; and protecting members having substantially flat circumferential side surfaces inserted into each space between adjacent two of said plurality of pairs so that said circumferential side surfaces can be in contact with said pairs.

8. The apparatus as claimed in claim 7, wherein said moving means moves said welder tool relative to said pairs which is fixed.

9. The apparatus as claimed in claim 7, wherein said moving means moves said pairs relative to said welder tool which is fixed.

10. A method for manufacturing a winding coil of a rotary electric machine, said method comprising:

a step for disposing a plurality of segments having connection ends on a core;

a step for positioning a plurality of pairs of said connection ends to be welded by a welder tool;

a step for targeting said welder tool on one of said pairs of said connection ends and for changing said target to an adjacent another one of said pairs; and a step for activating said welder tool when said welder tool is targeting at least one of said pairs and said another one of said pairs.

11. A method as claimed in claim 10, wherein said pairs of said connection ends are positioned in a line in said positioning step.

12. A method as claimed in claim 11, wherein said targeting step comprises:

a step for relatively moving a welder tool along said line of said pairs.

13. A method as claimed in claim 11, wherein said targeting and changing step comprises:

a step for targeting said welder tool on one of said pairs of said connection ends; and a step for moving said welder relatively along said line of said pairs.

14. A method as claimed in claim 13, wherein said activating step comprising:

a step for starting an activation of said welder tool; and a step for keeping an activation of said welder tool when said welder moves through at least two pairs of said connection ends.

15. A method as claimed in claim 11, wherein said pairs of said connection ends are positioned in a line along a circumference of said core.

16. A method as claimed in claim 15, wherein said targeting step comprises:

a step for relatively moving a welder tool along said circumferential line of said pairs.

17. A method as claimed in claim 10, wherein said activating step continuously activates said welder tool during said welder round said circumference.

18. A method as claimed in claim 15, wherein said plurality of pairs of said connection ends are positioned in a plurality of parallel lines.

19. A method as claimed in claim 18, wherein said targeting and said activating step are carried out on each of said lines of said pairs.

20. A method as claimed in claim 10, further comprising a step for inserting a protection members,between said pairs before said welder being activated.

21. A method of welding a plurality of pairs of connection ends of a plurality of segments of a circumferentially disposed stator winding of a rotary electric machine, said method comprising:

a step of inserting a protection member having substantially flat circumferential side surfaces between said pairs so that said side surfaces can be in contact with said pairs;

a step of activating a welder tool; and a step of circumferentially moving said welder tool relative to said pairs, wherein said pairs extend from a top portion of the projection member and toward said welding tool during the step of activating.

* * * * *